United States Patent  
Ng-Thow-Hing et al.

(10) Patent No.: US 8,116,519 B2  
(45) Date of Patent: Feb. 14, 2012

(54) 3D BEVERAGE CONTAINER LOCALIZER

(75) Inventors: Victor Ng-Thow-Hing, Sunnyvale, CA (US); Qingquan Wu, Palatine, IL (US)

(73) Assignee: Honda Motor Co., Ltd., Tokyo (JP)

( * ) Notice: Subject to any disclaimer, the term of this patent is extended or adjusted under 35 U.S.C. 154(b) by 902 days.

(21) Appl. No.: 12/140,126

(22) Filed: Jun. 16, 2008

(65) Prior Publication Data
US 2009/0080699 A1  Mar. 26, 2009

Related U.S. Application Data

(60) Provisional application No. 60/975,447, filed on Sep. 26, 2007.

(51) Int. Cl.
*G06K 9/00* (2006.01)
(52) U.S. Cl. ........................ 382/103; 382/100
(58) Field of Classification Search .................. 382/100, 382/103
See application file for complete search history.

(56) References Cited

U.S. PATENT DOCUMENTS

| | | | |
|---|---|---|---|
| 5,243,665 A | 9/1993 | Maney et al. | |
| 5,867,592 A | 2/1999 | Sasada et al. | |
| 6,095,989 A | 8/2000 | Hay et al. | |
| 6,473,079 B1 | 10/2002 | Kacyra et al. | |
| 6,813,395 B1 | 11/2004 | Kinjo | |
| 7,068,817 B2 | 6/2006 | Bourg, Jr. et al. | |
| 7,466,841 B2 * | 12/2008 | Bahlmann et al. | 382/103 |
| 7,747,045 B2 * | 6/2010 | Chinen et al. | 382/118 |
| 7,822,264 B2 * | 10/2010 | Balslev et al. | 382/154 |
| 7,948,493 B2 * | 5/2011 | Klefenz et al. | 345/441 |
| 2005/0216274 A1 | 9/2005 | Hyunwoo | |
| 2007/0127816 A1 | 6/2007 | Balslev et al. | |

OTHER PUBLICATIONS

Ballard, D.H., "Generalizing the Hough Transform to Detect Arbitrary Shapes", Pattern Recognition, vol. 13, No. 2, p. 111-122, 1981.
Brown, D.C., "Decentering Distortion of Lenses," Photomgrammetric Engineering, pp. 444-462, vol. 32, No. 3 May 1966.
Erdtmann, M., "Automatic calibration process of a machine vision system for workpiece pose measurement within a CNC machine," Sep. 2006, Can be retrieved from the internet: <URL:http://www.impa.br/opencms/pt/eventos/downloads/jornadas_2006/trabalhos/jornadas_mathias_erdtmann.pdf>.
Gheissari, N., "Model Selection for Visual Data Segmentation," 2004, Can be retrieved from the internet: <URL:http://www.ses.swin.edu.au/~ali/NiloofarThesis.pdf>.
Hartley, R, et al., "Multiple View Geometry in Computer Vision, Estimation-2D Projective Transmformations," Section 3 and 3.1, Cambridge University Press (2000), pp. 69-76.

(Continued)

*Primary Examiner* — Andrew W Johns
*Assistant Examiner* — Shefali Goradia
(74) *Attorney, Agent, or Firm* — Fenwick & West LLP; Mark E. Duell

(57) ABSTRACT

Objects placed on a flat surface are identified and localized by using a single view image. The single view image in the perspective projection is transformed to a normalized image in a pseudo plan to view to enhance detection of the bottom or top shapes of the objects. One or more geometric features are detected from the normalized image by processing the normalized image. The detected geometric features are analyzed to determine the identity and the location the objects on the flat surface.

22 Claims, 8 Drawing Sheets

OTHER PUBLICATIONS

Hartley, R., et al., "Multiple view geometry in computer vision," First Edition, 2003, p. 205-213, Cambridge University Press.

Jain, A., "Fundamentals of Digital Image Processing," Digital Image Processing, Section 9.5, Prentice-Hall (1989), pp. 357-362.

Kass, M., et al., "Snakes: Active contour models." International Journal of Computer Vision, vol. 1, No. 4, pp. 321-331 (1987).

PCT International Search Report and Written Opinion, PCT/US2008/068242, Oct. 7, 2008, 9 pages.

* cited by examiner

3D BEVERAGE CONTAINER LOCALIZER

CROSS-REFERENCE TO RELATED APPLICATIONS

This application claims priority under 35 U.S.C. §119(e) to co-pending U.S. Provisional Patent Application No. 60/975,447 entitled "Expanding Task Functionality in Established Humanoid Robots" filed on Sep. 26, 2007, which is incorporated by reference herein in its entirety. This application is related to U.S. patent application Ser. No. 12/124,016 entitled "Rectangular Table Detection Using Hybrid RGB and Depth Camera Sensors" filed on May 20, 2008; and U.S. patent application Ser. No. 12/134,078 entitled "Multi-Modal Push Planner for Humanoid Robots" filed on Jun. 5, 2008, which are incorporated by reference herein in their entirety.

FIELD OF THE INVENTION

The present invention is related to a method and system for localizing an object on a flat surface using a single view image, more specifically to a method and system for localizing an object having a certain top or bottom shape using a single view image.

BACKGROUND OF THE INVENTION

In many circumstances, a robot must acquire information about objects and its location within the surroundings. After the robot is placed in a new environment or changes in the environment occur, the robot must detect objects and locate the objects using one or more sensors. Based on sensor inputs, the robot determines a spatial relationship between the objects in the environment and performs various tasks associated with the objects. In some robots, the robots generate occupancy maps that store coordinates of various objects in the environment. The robots then use information in the occupancy maps in conjunction with the sensor inputs to perform various operations on objects in the environment.

After the location and the orientation of the flat surface are identified, the location and attributes of the object (e.g., width and height, and location of object on table's surface) must be determined in order to perform any actions on the objects placed on the flat surface. After the location of the object is determined, robotic manipulations such as grabbing or pushing may be performed on the object. Some robotic manipulations also require identification of the object. For example, when the robot is instructed to pick up a certain object from a table having two or more objects placed thereon, the robot must discern which object is the target object and then plan motions accordingly.

Conventional methods for detecting and localizing objects use stereoscopic cameras or time-of-flight depth sensors. In these methods, the depth information is obtained from the stereoscopic cameras or depth sensors. Then data-fitting is performed to find a model that fits the profile in the depth information. Once a fitting model is found, a three dimensional pose and orientation of the object is estimated, usually using an optimization method.

SUMMARY OF THE INVENTION

Embodiments of the present invention provide a method, a system and a computer program product for detecting and localizing objects using a single view image captured in a perspective projection. The single view image is mapped to a normalized image in a pseudo plan view by using a homography transform. The pseudo plan view allows more accurate detection of the bottom or top shapes of the objects. The normalized image is processed to detect geometric features that represent the objects. The spatial relationships between the detected geometric features are analyzed to identify and/or localize the objects.

In one embodiment, edges in the normalized image are detected using an edge detector. One or more types of Hough transforms are then applied to detect one or more types of geometric features in the normalized image. One type of Hough transform may be Hough circle transform for detecting circles in the image, and another type of Hough transform may be Hough line transform for detecting lines in the image. Other types of Hough transforms may be used to detect other geometric features in the image.

In one embodiment, the objects are identified by determining whether the geometric features (e.g., straight line) outlining the objects have certain spatial relationship with respect to other geometric features (e.g., circle). The spatial relationship include, for example, whether one geometric feature intersects with another geometric feature. The objects may also be identified by detecting other attributes of the geometric features (e.g., lengths) and/or distance between the geometric features.

In one embodiment, the location or the identity of the object determined from a current single view image is compared with the location or the identity of the object determined from one or more previous single view images. By comparing the location or the identity of the object in the current single view image and previous single view images, it can be determined whether the location or the identity of the object is consistent and has changed gradually over several frames. If the location or the identity determined from a current single view image is not consistent or changes abruptly, the current determination of location or the identity may be treated as an aberration or a false positive detection.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

The teachings of the present invention can be readily understood by considering the following detailed description in conjunction with the accompanying drawings.

DETAILED DESCRIPTION OF THE INVENTION

Figure 1:
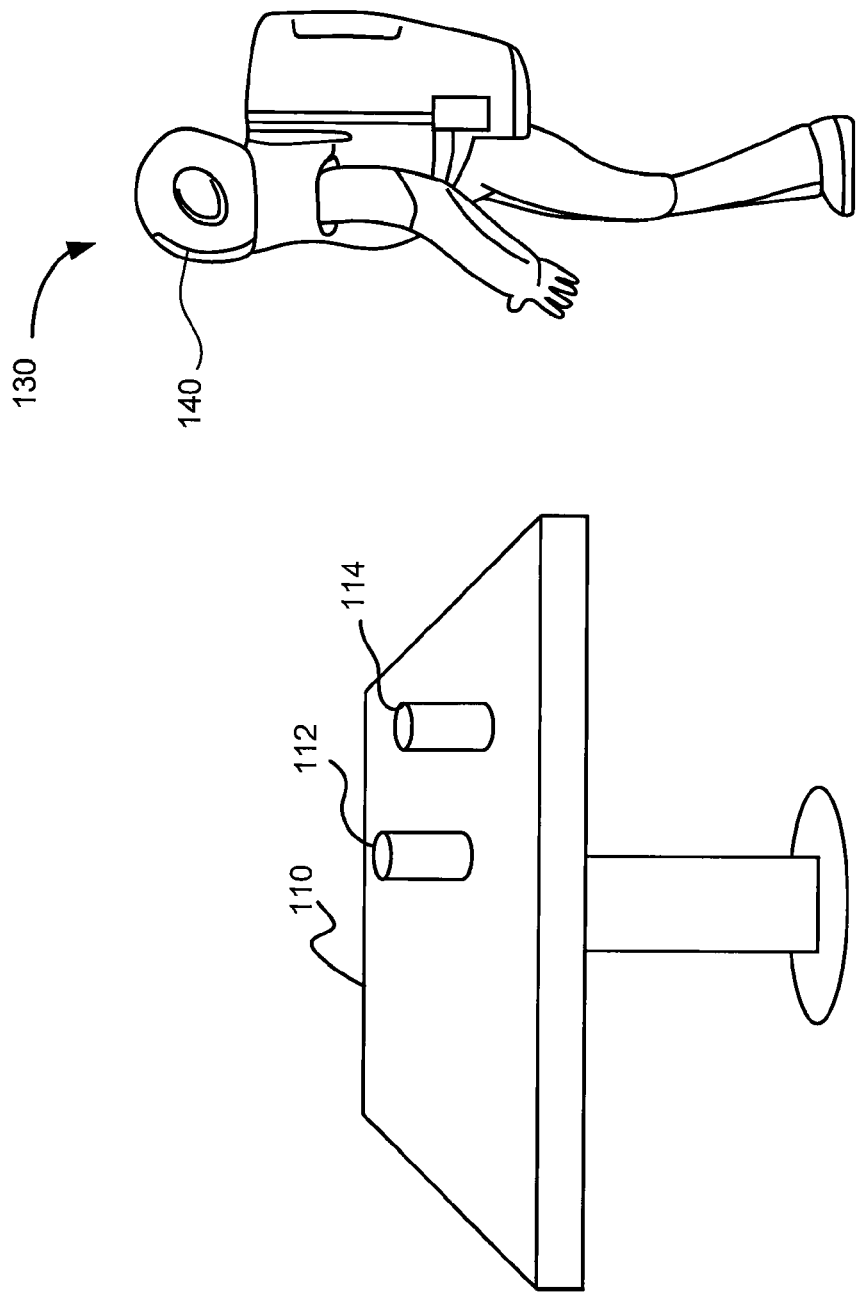
FIG. 1 is a diagram illustrating a robot in an environment where target objects are placed on a table, according to one embodiment of the present invention.

A preferred embodiment of the present invention is now described with reference to the figures where like reference numbers indicate identical or functionally similar elements.

Reference in the specification to "one embodiment" or to "an embodiment" means that a particular feature, structure, or characteristic described in connection with the embodiments is included in at least one embodiment of the invention. The appearances of the phrase "in one embodiment" in various places in the specification are not necessarily all referring to the same embodiment.

Some portions of the detailed description that follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by a variety of operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMS, magnetic-optical disks, read-only memories (ROMs), random access memories (RAMs), EPROMS, EEPROMS, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein, and any references below to specific languages are provided for disclosure of enablement and best mode of the present invention.

In addition, the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

Embodiments of the present invention provided a method, a device and a computer program product for detecting objects placed on a flat surface such as a table using a single view image in a perspective projection. The single view image in the perspective projection is mapped to a normalized image in a pseudo plan view to enhance detection of the bottom or top shapes of the objects. One or more geometric features are detected from the normalized image by processing the normalized image. The detected geometric features are analyzed to determine the identity and/or the location of the objects on the flat surface.

A single view image refers to an image captured by a single camera to cover a field of view. The single view image does not include stereoscopic images generated by two or more cameras and depth images generated by depth sensors. The single view image may be a black-and-white image, a grayscale image or a color image in various resolutions and color space.

A normalized image is an image converted from the single view image in a perspective image to mimic a plan view image. The normalized image is also referred to as a pseudo plan view image herein. In one embodiment, the normalized image shows the objects as if seen from a location directly above the object. The pseudo plan view image differs from a true orthographic plan view image in that some portions of the object occluded in a true plan view are visible while other portions of the object visible in the true plan view may be occluded in the pseudo projection.

A geometric feature refers to any geometric shape or any geometric elements of the geometric shape. The geometric shape includes, among others, a circle, a square, a triangle, and an ellipse. The geometric elements include, among others, straight lines or curves that form the geometric shapes. In one embodiment, the geometric features are detected from edges in the image.

Object information refers to any information about objects generated from the single view image. The object information includes at least the identity of the objects in the single view image. The object information may further include, among others, information about the location of the objects in three-dimensional coordinates.

Overview of Interaction Between Robot and Environment

FIG. 1 illustrates a robot 130 interacting with a rectangular table 110, according to one embodiment of the present invention. The robot 130 of FIG. 1 is a humanoid robot that is capable of performing various operations akin to human motions. One example of such a robot is ASIMO advanced humanoid robot of Honda Motor Co., Ltd., Tokyo, Japan. The robot 130 includes a camera 140 generating a stream of single view images, as described below in detail with reference to FIG. 2. Although the following embodiments are described below with reference to a humanoid robot 130, the present invention is not limited to humanoid robots and may be used in other types of robots.

In one embodiment, the robot 130 determines the location of the top surface of a flat surface 110 by using a method, for example, as disclosed in U.S. patent application Ser. No. 12/124,016 filed on May 20, 2008 entitled "Rectangular Table Detection Using Hybrid RGB and Depth Camera Sensors," which is incorporated by reference herein in its entirety. The robot 130 also detects and localizes objects 112, 114 for robotic operations (e.g., grabbing or pushing) using the single view image captured by the camera 140. In one embodiment, the location of the table 110 and other objects 112, 114 on the flat surface 110 are expressed in terms of three-dimensional coordinates and stored in the robot 130, as described below in detail with reference to FIG. 2.

In one embodiment, the robot 130 also tracks and updates the movements of objects 112, 114 within the three-dimensional coordinate system. The movement of the objects 112, 114 may be caused by operations performed by the robot 130 (e.g., grabbing or pushing of the objects) or other reasons (e.g., moving by a human). In both cases, the movements of the objects 112, 114 may be sensed and tracked by monitoring the single view images generated by the camera 140.

Figure 2:
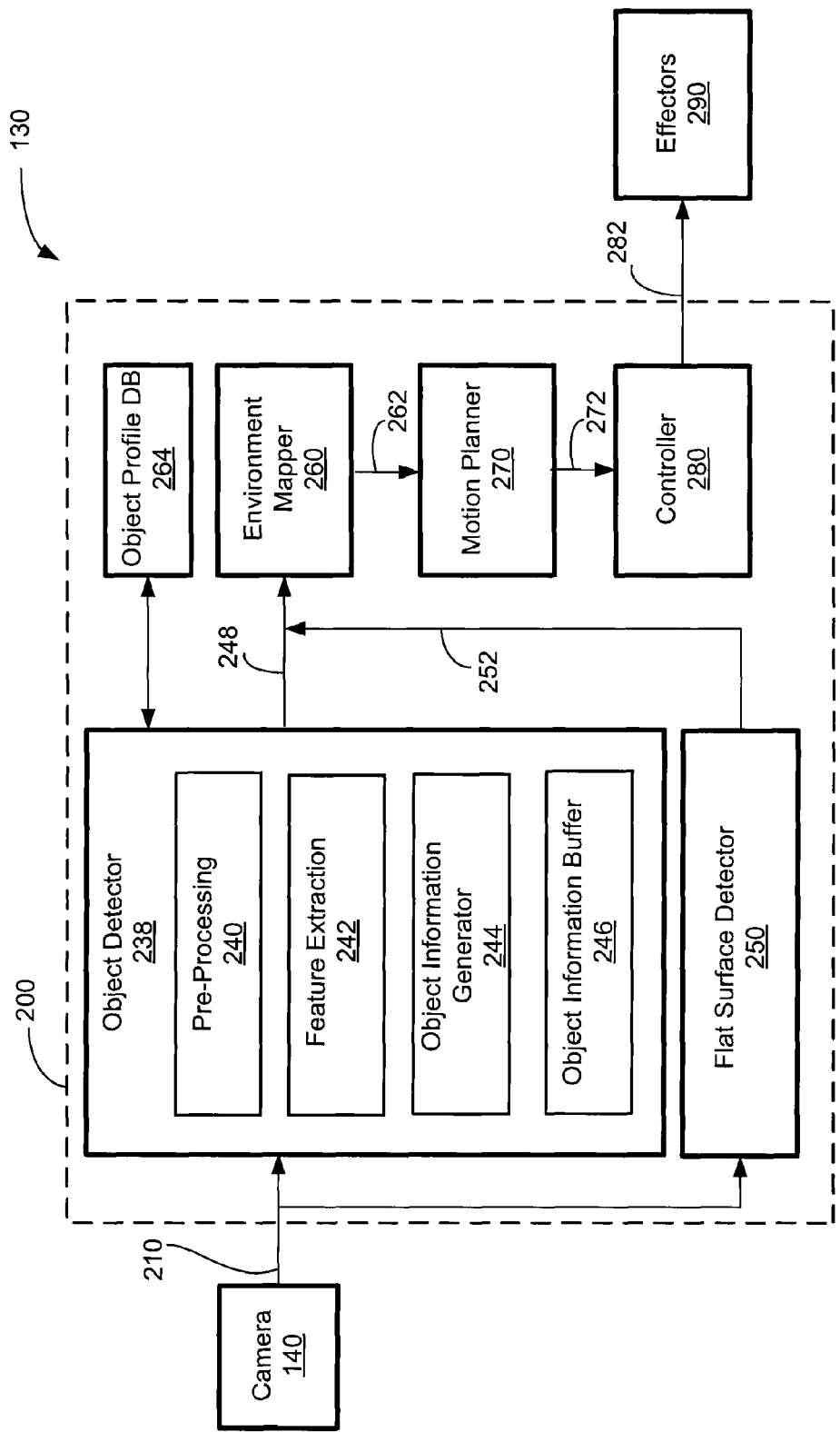
FIG. 2 is a block diagram of a robot according to one embodiment of the present invention.

Architecture of Processing Module Device for Identifying and Localizing Objects on a Flat Surface FIG. 2 is a block diagram of the robot 130, according to one embodiment of the present invention. As illustrated in FIG. 2, the robot 130 includes three major components: a camera 140, a processing module 200, and effectors 290. The camera 140 generates single view images 210 of the environment that surrounds the robot 130. The processing module 200 receives information from, among other sources, the camera 140, detects objects surrounding the robot 130, and sends control signals 282 to effectors 290. Other components of the robot 130 not essential to the present invention are omitted herein for the sake of brevity and to avoid obfuscating the present invention.

The camera 140 generates a stream of single view images 210 that capture two-dimensional shapes of the objects in a scene. The effectors 290 are coupled to the processing module 200 to receive command signals 282 to cause certain actions by the robot 130. The effectors 290 may be various devices causing real-world events including, among others, motors and actuators. The command signals 282 may cause multiple effectors 290 of the robot 130 (e.g., joints) to move in a coordinated manner to perform some meaningful tasks such as walking or pushing of an object.

The processing module 200 includes, among other components, an object detector 238, a flat surface detector 250, an object profile database 264, an environment mapper 260, a motion planner 270, and a controller 280. Each of these components, in conjunction with other components, may be implemented, for example, in software, hardware, firmware or any other combination thereof. Further, the processing module 200 may be implemented as a general purpose computer or dedicated computing devices. The processing module 200 may also be distributed throughout the robot 130. For example, multiple controllers 280 for different effectors may be provided at different parts of the robot 130.

The flat surface detector 250 detects an object having a flat surface by using the image data 210. In one embodiment, the flat surface detector 250 receives depth images from a depth sensor in addition to the single view images 210 from the camera 140. In one embodiment, the flat surface detector 250 determines the location of the flat surface by using a method, for example, as disclosed in U.S. patent application Ser. No. 12/124,016 filed on May 20, 2008 entitled "Rectangular Table Detection Using Hybrid RGB and Depth Camera Sensors," which is incorporated by reference herein in its entirety.

The object detector 238 functions in conjunction with the object profile database 264 to determine the identity and/or the location of the objects 112, 114 on the flat surface 110, as described below in detail. In one embodiment, the object detector 238 generates and outputs object information 248 including, among others, information about the identity and location of the object. The object information 248 is fed to the environment mapper 260.

The environment mapper 260 maintains and tracks information about the objects in the surroundings of the robot 130. Specifically, the environment mapper 260 receives the object information 248 and flat surface information 252, and maps the objects 110, 112, 114 to three-dimensional coordinates. The environment mapper 260 may store information regarding the profiles (e.g., width, height, and length of objects) and the locations of the object as detected by the robot 130. In one embodiment, the environment mapper 260 also stores information about location and attributes (e.g., length, width and height) of objects that is provided by a user or other sources. The environment mapper 260 provides environment information 262 to the motion planner 270. The environment information 262 includes the information concerning location and profiles of the objects in the surroundings of the robot 130.

The motion planner 270 generates plans for motions to be taken by the robot 130. Specifically, the motion planner 270 receives the environment information 262 and produces plans (e.g., walk to a point via a certain path) for one or more motions to be executed by the robot 130. The planned motions may be associated with tasks the robot 130 is programmed to perform. Based on the plans, the motion planner 270 sends commands 272 (e.g., bend leg joint by 30 degrees) to the controller 280. The controller 280 then sends control signals 282 to various effectors 290 to perform motions by the effectors 290.

Components of Object Detector

The object detector 238 includes, among other modules, a pre-processing module 240, a feature extraction module 242, an object information generator 244, and an object information buffer 246. Each of these components, in conjunction with other components, may be implemented, for example, in software, hardware, firmware or any other combination thereof. The pre-processing module 240 is responsible for, among other tasks, removing distortions in the single view image 210 caused by imperfections in the lens of the camera 140. In one embodiment, conventional "Plumb Bob" camera model, for example, as disclosed in D. C. Brown, "Decentering Distortion of Lenses," Photometric Engineering, pages 444-462, Vol. 32, No. 3 (1966), and OpenGL texture mapping are used to remove the distortions in the single view image 210.

The object detector 238 determines the identity and/or the location of the objects in the single view image 210 by processing single view images 210 from the camera 140. Because the object detector 238 does not rely on depth information that is often noisy and unreliable, the object detector 238 can identify and locate the objects more accurately. Furthermore, the identification and localizing of the objects based only on the single view images is more efficient because it does not involve processing of depth or stereo images or subsequent processes based on the depth images (e.g., optimization).

In the single view image captured at a location not directly above an object, the top shape and bottom shape of the object (if not occluded by the top shape) appear slanted. For example, a circular base of a cup may appear elliptic if viewed from a location not directly above the cup. Similarly, a square top shape of a dice may appear as a trapezoid if viewed from a location not directly above the dice. As the viewing location and angle change, the top or bottom shapes of the objects change accordingly. The changes of the top or bottom shapes of the object, however, make it difficult to consistently identify and localize the objects.

Figure 3A:
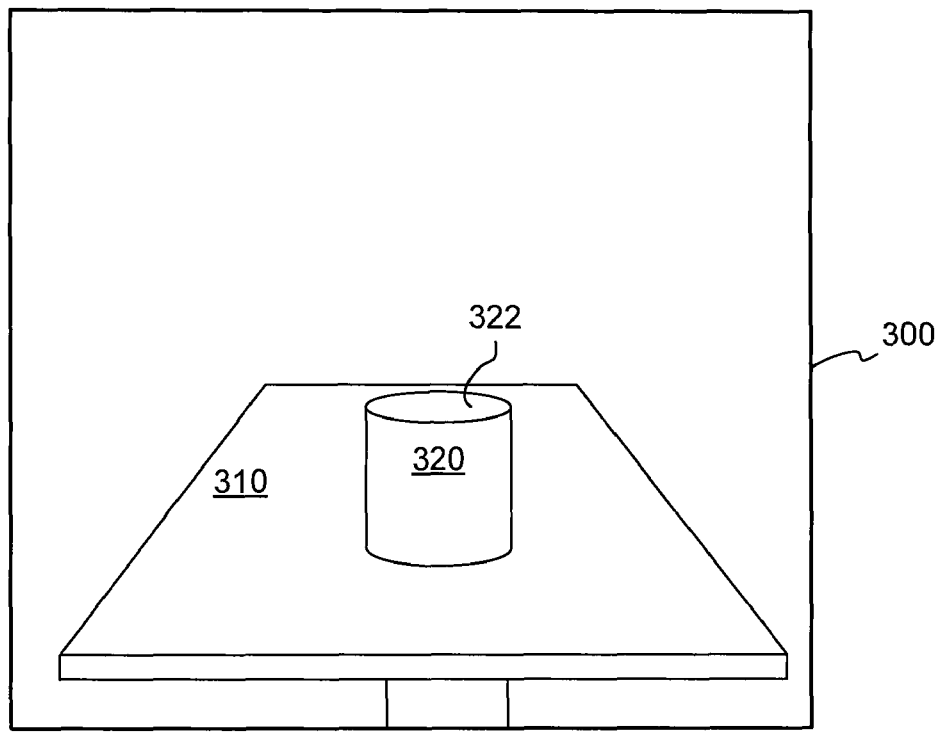
FIG. 3A is an image including a beverage can in a perspective projection, according to one embodiment of the present invention.

Therefore, in one embodiment of the present invention, the pre-processing module 240 converts the single view image 210 captured by the camera 140 into a pseudo plan view which shows the object as if viewed from a location directly over the object. The pseudo plan view is not identical to a true plan view because the pseudo plan view shows parts of the object that are not visible in the true plan view and may not show certain parts of the object that are visible in the true plan view. Referring to FIG. 3A, a single view image 300 captured by the camera 140 is illustrated. In FIG. 3A, a beverage can 320 is illustrated as being placed on a square table 310. The beverage can 320 is cylindrically shaped having a circular top surface, a circular bottom surface, and a sidewall between the top surface and the bottom surface. Because the single view image was captured from a location slightly above the top surface of the beverage can 320, the top shape and the bottom shape of the beverage can 320 appear elliptical in the single view image 300. Similarly, the square surface of the table 310 appears in a trapezoid shape because the single view image 300 is in a perspective projection.

Figure 3B:
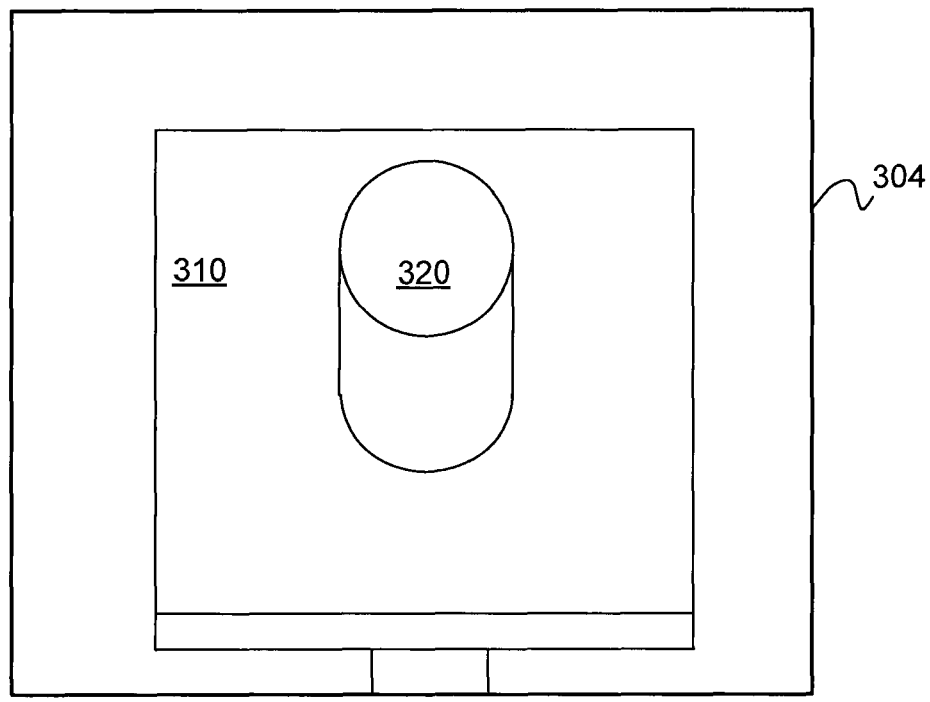
FIG. 3B is a homography transformed version of the image illustrated in FIG. 3A, according to one embodiment of the present invention.

FIG. 3B is a normalized image 304 that is mapped from the image 300 of FIG. 3A by applying a homography transform, for example, R. Hartley and A. Zisserman, "Multiple View Geometry in Computer Vision," section 3 and 3.1, Cambridge University Press (2000). Specifically, the pre-processing module 240 applies the homography transform to the image 300 and maps the single view image 300 in the perspective projection to the normalized image 304. The normalized image 304 is similar to the plan view of the image 300 of FIG. 3A captured from a location directly above the beverage can 320. In the normalized image 304, the top shape of the beverage can 320 and the table 310 are a circle and a square, respectively. By converting the image 300 in a perspective image to a normalized image 304, the top or bottom shapes of the objects remain consistent regardless of changes in the viewing point of the objects. Therefore, the objects can be identified and localized consistently and accurately using the top or bottom shape of the objects even when the robot 130 or the objects 112, 114 are moved.

The parameters for the homography transform may be four two dimensional reference points on the flat surface in an image that map one-to-one to another set of four target coordinates in two dimensional reference points in a normalized image. In one embodiment, the four corners of the table 310 can be used as the reference points. The four corners may be reconstructed from the detected edges of a table and subsequently used to perform the homography transformation. The target normalized coordinates can be chosen to map the original flat surface image to an area bounded by the four corners of the table 310. The physical flat surface dimensions are also needed to convert the normalized coordinates to metric dimensions. In one embodiment, the length and width of the table 310 are provided manually or can be computed automatically from the flat surface detector 250.

In one embodiment, the pre-processing module 240 performs further image processing on the normalized image 304 such as sharpening to allow enhanced detection of weak edges in the normalized image 304. Then the pre-processing module 240 detects edges in the normalized image 304. In one embodiment, a canny edge detector is used for detecting edges in the normalized image 304.

After the pre-processing module 240 detects edges in the normalized image 304, the feature extraction module 242 detects geometric features from the edges in the normalized image 304. In one embodiment, the geometric features in the normalized image 304 are detected by applying one or more types of Hough transform. One type of Hough transform may be Hough circle transform and another type of Hough transform may be Hough line transform described, for example, in A. Jain, "Fundamentals of Digital Image Processing," section 9.5, Prentice-Hall (1989).

The object information buffer 246 stores the object information 248 generated by the object information generator 244 from one or more previous frames of images. Specifically, the object information buffer 246 stores the identity and/or location of the objects detected in previous frames of images. The object information stored in the object information buffer 246 is used by the object detector 238 to confirm temporal consistency of the object information.

Specifically, the object detector 238 compares the identity and/or location of the object detected from the current image to the identity and/or location of the object detected from one or more previous frames of images. An abrupt change in the identity or location of the object in the current frame may be due to reasons other than actual changes of the object such as noises in the image, occlusion of the target object by other objects, and temporary changes in lighting conditions. Such reasons may cause the object information generator 244 to generate false or inaccurate object information for the current frame of image. In one embodiment, the object information 248 generated from the current frame is discarded if the identity and/or location information deviates beyond a threshold within a fixed number of frames from the identity and/or location information generated from the previous frames. If the deviation persists and is stable longer than a fixed threshold number of frames, then the location information is subsequently updated to the new position.

Example of Identifying and Localizing Objects

In the following examples, identifying and/or localizing of objects are described in terms of two different objects: a beverage can and a wine flute. The following examples illustrate the method of identifying and/or localizing the objects by detecting two geometric features (i.e., circles and straight lines) from the edges in the normalized image. The beverage can and the wine flute are merely examples of objects that can be detected, and various other types of objects can also be detected. Also, other types of geometric features (e.g., curves)

may be detected in addition to or in place of the circles and the straight lines depending on the shape of the object to be detected.

Figure 4A:
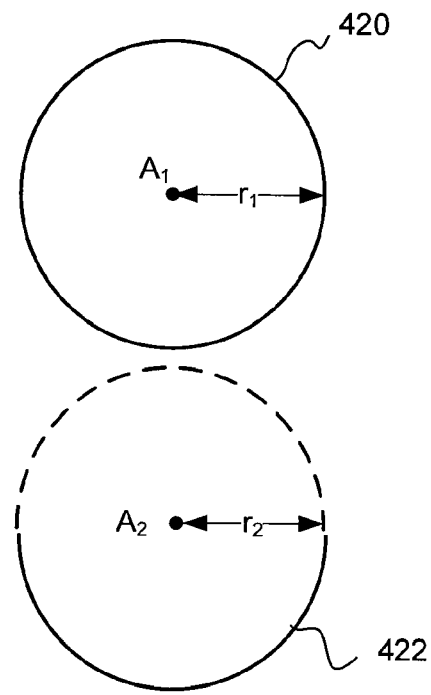
FIG. 4A is a diagram illustrating detection of circles using a Hough circle transform, according to one embodiment of the present invention.
Figure 4B:
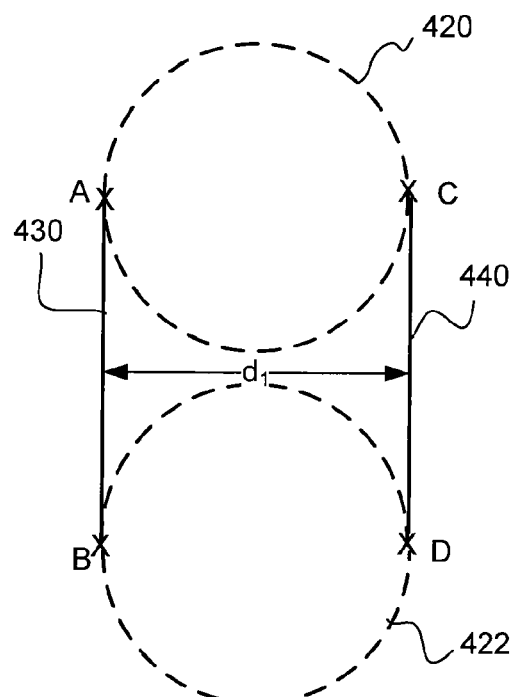
FIG. 4B is a diagram illustrating detection of straight lines using a Hough line transform, according to one embodiment of the present invention.

FIGS. 4A and 4B illustrate detecting circles and straight lines in the normalized image 304 of FIG. 3B by applying the Hough circle transform and the Hough line transform, according to one embodiment of the present invention. Specifically, FIG. 4A illustrates the result of applying the Hough circle transform to the edges of the image 304. The Hough circle transform is configured so that circles partly occluded by other objects (i.e., partly not visible) in the image are also detected. Consequently, in FIG. 4A, two circles 420, 422 are detected by applying the Hough circle transform. One circle 420 represents the top surface of the beverage can 320 and the other circle 422 represents the bottom surface of the beverage can 320. By analyzing the result of Hough circle transformation, the centers ($A_1$, $A_2$) and the radiuses ($r_1$, $r_2$) of the circles 420, 422 can be determined.

In one embodiment, the image for processing may be cropped to eliminate visual artifacts or objects beyond the area of interest. For example, an area representing the flat surface of the table 310 may be defined to perform Hough circle transform or Hough line transform. The area of interest may be cropped either in a single view image (for example, the single view image 300 of FIG. 3A) before applying the homography transform or in a normalized image (for example, the normalized image 304 of FIG. 3B) after applying the homography transform. Line segments within the cropped area of interest may be detected for further processing. The portion of the image outside the area of interest may be noisy or include the features of objects that are not of interest. By cropping the image and performing detection of features in the cropped image, the detection of images may be focused on areas that are more likely to include objects of interest and becomes less susceptible to noises.

The Hough line transform may be configured so that partly occluded or fragmented line segments can be detected. FIG. 4B illustrates two straight line segments 430, 440 detected by applying the Hough line transform on the edges of the normalized image. In the example of FIG. 4B, the line segments 430 and 440 are substantially parallel and separated by a distance $d_1$. The line segments 430, 440 intersect with the circle 422 at points B, D, respectively. Such spatial relationship of geometric features (i.e., intersecting of circles and straight lines) serves as a basis for distinguishing one object from another, as described below in detail.

In another embodiment, other image processing techniques for boundary extraction such as contour following edge linking and dynamic programming are used instead of the Hough transforms to detect geometric features in the image.

The object information generator 244 determines the location and/or identity of the object in the normalized image 304 and generates object information based on the detected geometric features. The object information generator 244 may communicate with the object profile database 264 to determine if geometric features (e.g., circles and straight lines) detected in the image outline a certain object. Specifically, the object profile database 244 stores profiles of various objects based on geometric features found in objects, and the relationship between the geometric features for objects. The object information generator 244 may determine the identity and/or location of the objects based on the profiles of various objects stored in the object profile database 264.

The relationships between the geometric features for identifying objects include, among others, the following: (i) whether certain geometric features are detected in the edges outlining the object; (ii) whether a certain geometric feature intersects with another geometric feature (e.g., a circle representing a top or bottom surface of a beverage can intersects with two straight lines representing sidewalls of the beverage can); (iii) the angle between the geometric features (e.g., straight lines representing a square table intersect at an angle of 90 degrees); (iv) a distance between the geometric features (e.g., a distance between straight lines representing sidewalls of a beverage container is approximately the same as the diameter of the circle representing the top or bottom surface whereas a distance between straight lines representing a stem of a wine flute is smaller than the diameter of the circle representing the diameter of the bowl); (v) relative lengths of the detected straight lines or curves (e.g., whether the straight lines representing sidewalls of the beverage container are long or short relative to the diameter of the top or bottom surface); and (vi) relative orientation differences between the geometric features (e.g., the different profiles of stems that may distinguish types of tapered stems of wine glasses, goblets or flutes). These relationships are merely illustrative and other criteria may be used in conjunction with these criteria to identify the object in the image. The geometric relationships for one or more objects are stored in the object profile database 264.

The object information generator 244 compares attributes of the geometric features detected from the normalized image 304 against the profile of the objects stored in the object profile database 264 to identify the object in the normalized image. In one embodiment, the object information generator 244 determines the object that best matches the detected geometric features and their relationship in the object profile database 264, and outputs the object information 248 indicating the identity and/or the location of the object.

Figure 5A:
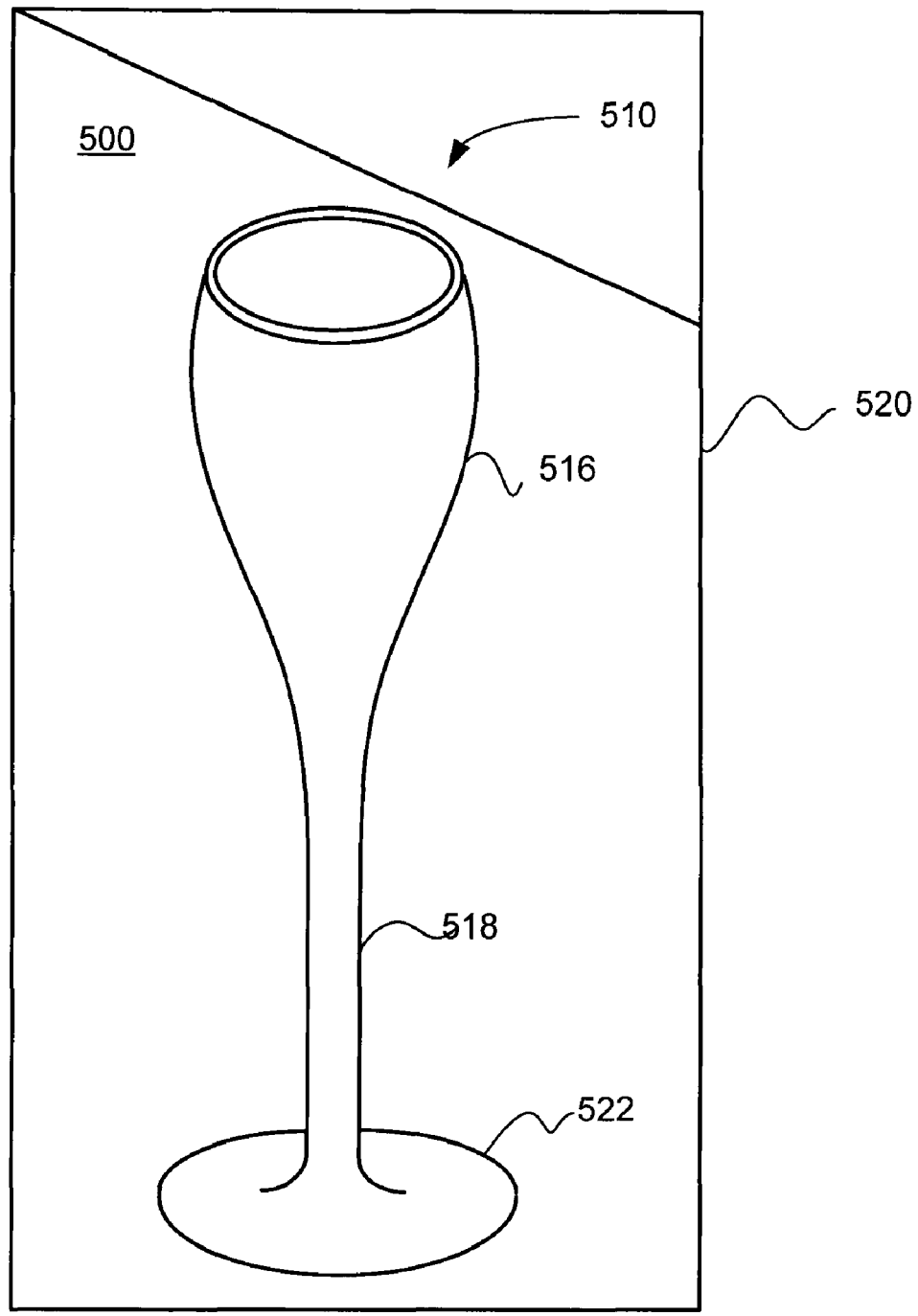
FIG. 5A is an image including a wine flute in a perspective projection, according to one embodiment of the present invention.

FIG. 5A illustrates an image 520 including a wine flute 510 placed on a table 500. The wine flute 510 has a shape similar to the beverage can 320 of FIGS. 3A and 3B but is distinguishable from the beverage can 320 for having a narrow stem 518 that extends between a base 522 and a bowl 516. In one embodiment, the wine flute 510 and the beverage can 320 may be distinguished by detecting the width of the stem 518 relative to the bowl 516 or the base 522.

Figure 5B:
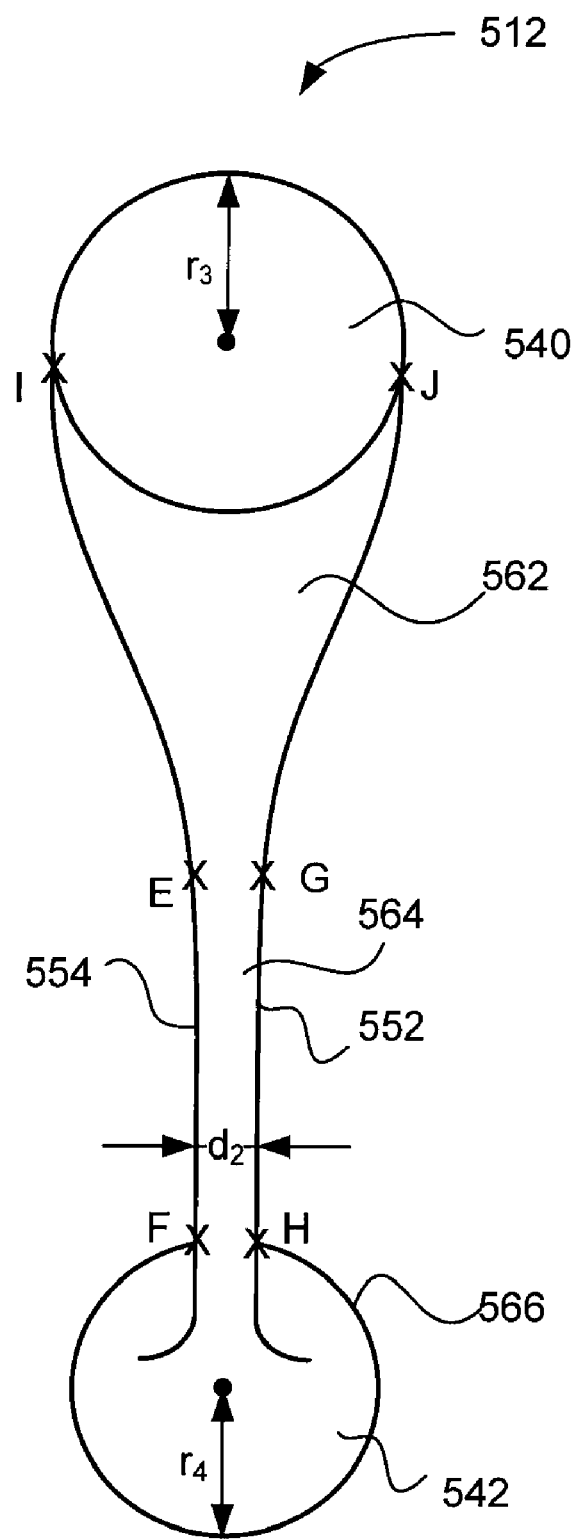
FIG. 5B is a homography transformed version of the image illustrated in FIG. 5A, according to one embodiment of the present invention.

FIG. 5B illustrates the wine flute 510 of FIG. 5A converted into a normalized image using a homography transform. The normalized image includes the normalized version of the wine flute 512 having a bowl 562, a base 566, and a stem 564 that extends between the bowl 562 and the base 566.

The Hough circle transform and the Hough line transform are applied to the edges of the wine flute 512 to determine if any circles or straight lines are present in the edges of the image. Specifically, by using the Hough circle transform, two circles 540, 542 may be detected from edges of the wine flute 512. One circle 540 represents the top shape of the bowl 562, and the other circle 542 represents a circular base of the wine flute 512. A Hough line transform is applied to the normalized image to detect straight line segments 552, 554 in the edges detected in the image.

In one embodiment, the object information generator 244 determines the number of circles that intersect with the straight line segments. The straight line segments 552, 554 representing the edges of the wine flute intersect at points F, H with one circle 542 representing the base 566. The straight line segments 552, 554, however, do not intersect with the circle 540 representing the top of the bowl 562 (the line segments I-E and J-G intersecting with the circle 540 are curves, not straight lines). In contrast, the line segments 430, 440 representing the edges of the beverage can 320 intersect with two circles 420, 422 representing the top surface and the bottom surface of the beverage can 320. Therefore, the number of circles intersecting with the straight line segments may be used by the object information generator 244 to distinguish between the beverage can 320 and the wine flute 516.

In one embodiment, the object information generator 244 measures the distance $d_1$, $d_2$ between the straight line segments to identify the object in the image. Referring to FIG. 4B, the distance $d_1$ between the two line segments 430, 440 for the beverage can 320 approximates the diameters of the two intersecting circles 420, 422. Referring to FIG. 5B, the distance $d_2$ between the two line segments 552, 554 for the wine flute 512 is much smaller than the diameter of the intersecting circle 542. By determining the ratio between the diameter(s) of the intersecting circle(s), the object information generator 244 determines whether the object captured in the image is a beverage can 320 or a wine flue 510. In one embodiment, the object in the image is determined as a wine flute 510 when the distance $d_2$ between the line segments 552, 554 is less than half (½) the radius $r_4$ of the base 566.

In another embodiment, additional criteria such as (i) the lengths of the straight lines 430, 440, 554, 552, and (ii) the ratio of the radiuses ($r_3$, $r_4$) of the detected circles are also used to identify the object in the normalized image.

The detected geometric features illustrated with respect to FIGS. 3A to 5B are merely illustrative. Various other types of geometric features such as curves may also be detected to identify the objects in the image. To allow detection of other shapes, Hough transform generalized for arbitrary shape as described, for example, in D. H. Ballard, "Generalizing the Hough Transform to Detect Arbitrary Shapes", Pattern Recognition, Vol. 13, No. 2, p. 111-122, 1981, which is incorporated by reference herein in its entirety, may be used. Alternatively, active contour models described, for example, in M. Kass, A. Witkin, and D. Terzopoulos, "Snakes: Active contour models." International Journal of Computer Vision," vol. 1, no. 4, pages 321-331 (1987), which is incorporated by reference herein its entirety, may be used to detect arbitrary shapes.

After the object is identified, the object detector 238 determines the location of the object by analyzing the geometric features outlining the object. The location of the object is computed by locating specific geometric features from the object after the object is detected. In one embodiment, the two dimensional center of the detected circular base may be used to estimate the position of the object. This two dimensional center can be converted to a three dimensional location, for example, by first locating the two dimensional image coordinates in the pseudo plan view and converting the dimensional image coordinates into two dimensional metric coordinates using a scale factor. The scaling factor may be calculated by dividing the physical metric dimensions of the table 310 by the distance between coordinates in the normalized image corresponding to the physical metric dimensions. After the two dimensional metric coordinates are obtained, the two dimensional metric coordinates are converted into a three dimensional position by combining the known two dimensional metric position of the object on the flat surface with the three dimensional orientation obtained by the flat surface detector 250.

Method of Detecting Objects on a Flat Surface

Figure 6A:
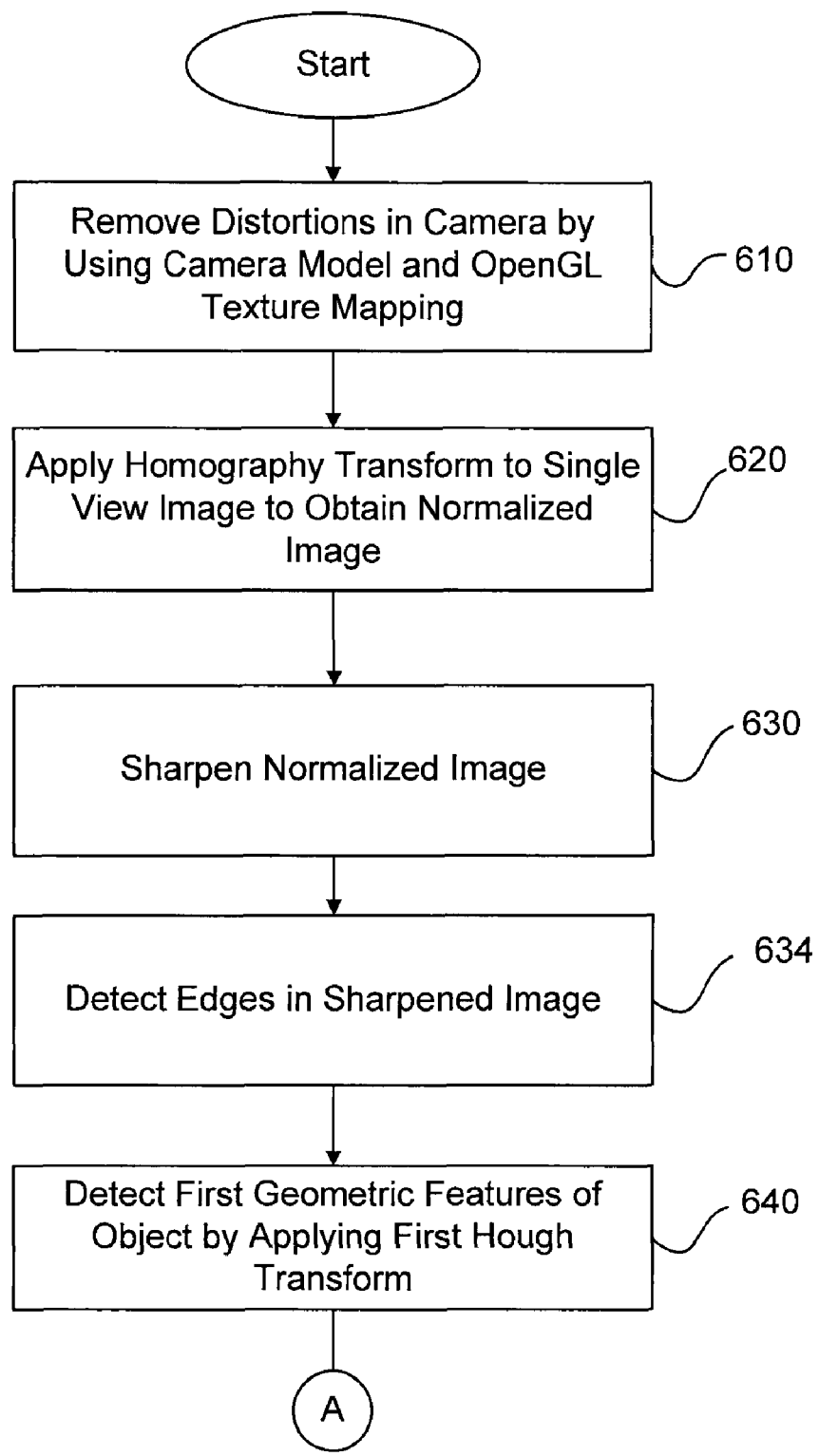
FIGS. 6A and 6B are flow charts illustrating a method for detecting and localizing an object on a flat surface, according to one embodiment of the present invention.
Figure 6B:
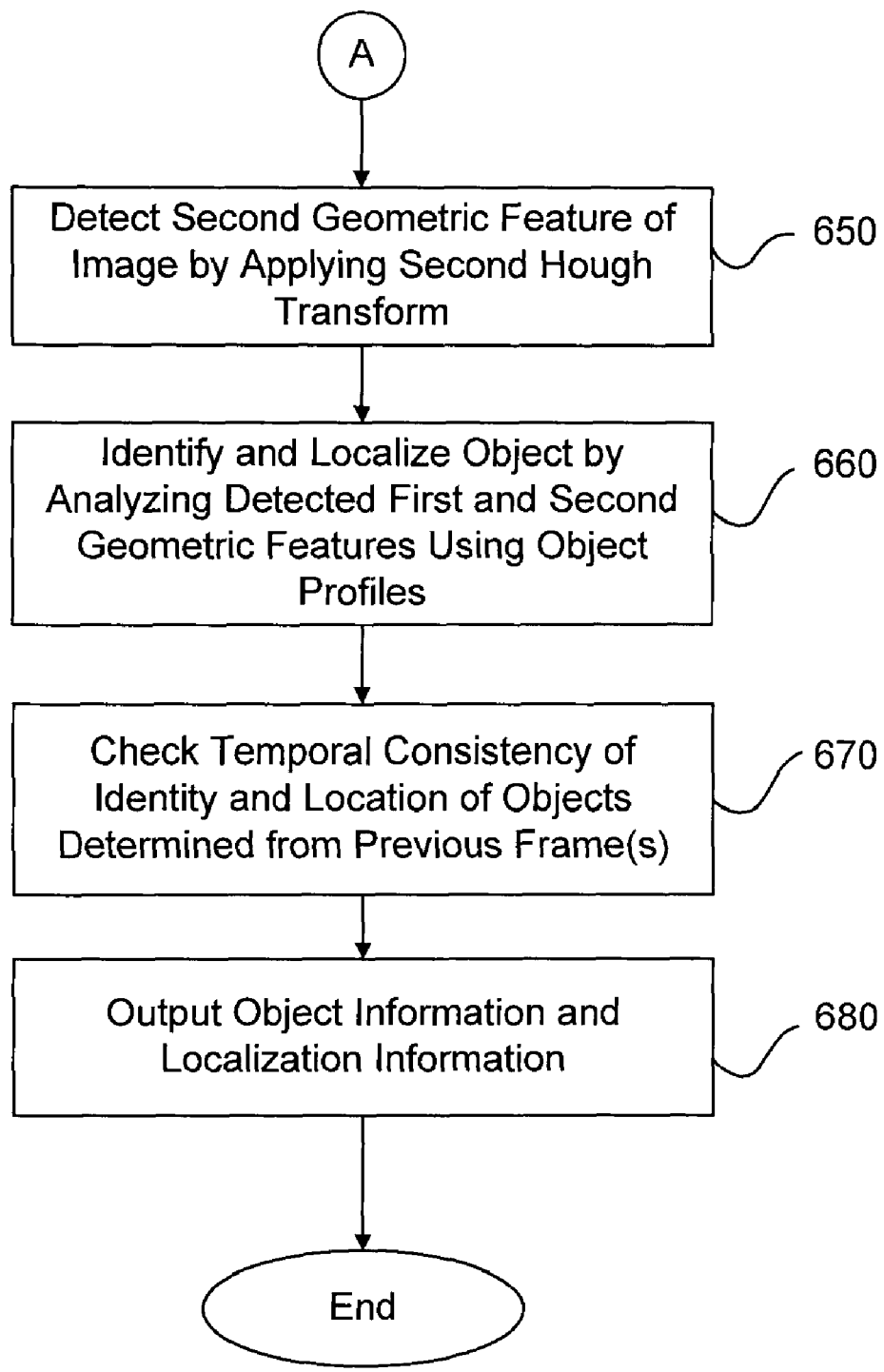

FIGS. 6A and 6B illustrate flowcharts of a method for detecting an object on a flat surface, according to one embodiment of the present invention. First, the distortions in the image captured by the camera are removed 610 by using a camera model in combination with OpenGL texture mapping. OpenGL texture mapping is optionally used to accelerate computation with hardware. Then a homography transform is applied 620 to the image to obtain a normalized image in a pseudo plan view. By mapping the image in a perspective projection to a normalized image in a pseudo plan view, the geometric features in the image can be detected more accurately and robustly. Then the normalize image is sharpened 630 to enhance subsequent edge detection.

The edges in the sharpened image are then detected 634 using conventional methods such as a canny edge detector. A first Hough transform (e.g., Hough circle transform) is then applied 640 to the edge-detected image to detect first geometric features (e.g., circles) of the object. A second Hough transform (e.g., Hough line transform) is then applied 650 to the edge-detected image to detect second geometric features (e.g., straight lines) of the object. Additional Hough transforms adapted for detecting other geometric features may also be applied to detect other geometric features.

The object in the image is then identified and localized 660 by analyzing the first and second geometric features detected from the image using information of objects stored in the object profile database 264. Specifically, the spatial relationship between the geometric features is analyzed by the object information generator 244 to determine whether the detected geometric features match the profiles of objects stored in the object profile database 264.

The identity and/or location of the object determined from the current frame of image is then checked 670 against the identity and/or location of the object in one or more previous frames of image. Specifically, the object information stored in the object information buffer 246 is retrieved to check the temporal consistency of the object information generated from the current image. If the identity and/or location of the object is consistent or does not deviate significantly from the identity and/or location of the object in the previous frame, then the object information is outputted 680. In contrast, if the identity and/or the location of the object is inconsistent or deviates significantly from the identity and/or location of the object determined from previous frames of images, the object information 248 generated from the current frame may be discarded. If the deviation is stable for more than a fixed amount of frames or time, the object's position is updated to reflect the new position of the object.

Alternate Embodiments

In one embodiment, the object detector 238 is used in systems other than robots. For example, the object detector 238 may be used in other systems such as a surveillance system or physical tangible user interface for an interactive application such as a game.

In one embodiment, the detected geometric features are filtered before generating the object information based on the object profiles stored in the object profile database 264. The object information buffer 246 stores the location and attributes of geometric features (e.g., length or type) detected in the previous frames. If the location or attributes of the geometric features in the current frame of image differ significantly from the geometric features detected in the previous frames of images, then the geometric features detected in the current frame may be discarded because this feature may be due to noise or reasons other than the presence of the actual features in the image. This process may substitute or supplant the process of checking 670 temporal consistencies in the object information.

In one embodiment, the normalized image 304 is scanned for target objects. That is, the object information generator 244 does not identify or locate all the objects on the flat surface. Rather, the object information generator 244 searches for a certain object, for example, a beverage can in the single view image. In this case, edges of the image are screened for geometric features that meet a set of criteria. To detect beverage cans, for example, the edges of the image are searched for circles and straight lines. Then, circles and straight lines that do not intersect are filtered out. The remaining circles and straight lines are evaluated based on whether the distance between the straight lines are approximately the diameter of the circle. Different geometric features and criteria may be used to search for different types of objects.

Although the present invention has been described above with respect to several embodiments, various modifications can be made within the scope of the present invention. Accordingly, the disclosure of the present invention is intended to be illustrative, but not limiting, of the scope of the invention, which is set forth in the following claims.

What is claimed is:

1. A method of detecting and localizing an object, comprising:
    receiving a first single view image including the object, the first single view image in a perspective projection;
    mapping the single view image to a normalized image by a homography transform, the normalize image representing a pseudo plan view of the object;
    detecting first geometric features from the normalized image;
    analyzing the detected first geometric features to identify the object;
    generating first object information including the identity of the object; and
    outputting the first object information.

2. The method of claim 1, further comprising:
    generating location information of the object by analyzing the detected first geometric features, the location information representing location of the object; and
    adding the location information to the first object information.

3. The method of claim 1, wherein detecting the first geometric features comprises:
    detecting edges in the normalized image; and
    detecting circles in the normalized image by performing Hough circle transform on the detected edges.

4. The method of claim 1, further comprising:
    detecting second geometric features from the normalized image; and
    selecting one or more first geometric features as outlining the object responsive to identifying that the first geometric features intersect with two or more second geometric features.

5. The method of claim 4, wherein detecting the second geometric features comprises:
    detecting edges in the normalized image; and
    detecting straight lines in the normalized image by performing Hough line transform on the detected edges.

6. The method of claim 4, further comprising:
    determining the object as a first object responsive to determining that a distance between two second geometric features that intersect with the first geometric features is smaller than a threshold; and
    determining the object as a second object responsive to determining that the distance is not smaller than the threshold.

7. The method of claim 1, further comprising determining the first object information as incorrect responsive to difference between the first object information and second object information exceeding a threshold, the second location information determined from a second single view image preceding the first single view image.

8. The method of claim 1, further comprising determining location of the object based on the two dimensional location of the first feature and location information of another object in the normalized image.

9. A computer readable storage medium structured to store instructions adapted to detect and localize an object, the instructions when executed, cause the processor to:
    receive a first single view image including the object, the first single view image in a perspective projection;
    map the single view image to a normalized image by a homography transform, the normalize image representing a pseudo plan view of the object;
    detect first geometric features from the normalized image;
    analyze the detected first geometric features to identify the object;
    generate first object information including the identity of the object; and
    output the first object information.

10. The computer readable storage medium of claim 9, further comprising instructions to:
    generate location information of the object by analyzing the detected first geometric features, the location information representing location of the object; and
    add the location information to the first object information.

11. The computer readable storage medium of claim 9, wherein instructions to detect the first geometric features comprise instructions to:
    detect edges in the normalized image; and
    detect circles in the normalized image by performing Hough circle transform on the detected edges.

12. The computer readable storage medium of claim 9, further comprising instructions to:
    detect second geometric features from the normalized image; and
    select one or more first geometric features as outlining the object responsive to identifying that the first geometric features intersect with two or more second geometric features.

13. The computer readable storage medium of claim 12, wherein the instructions to detect the second geometric features comprise instructions to:
    detect edges in the normalized image; and
    detect line features in the homography transformed image by performing Hough line transform on the detected edges.

14. The computer readable storage medium of claim 12, further comprising instructions to:
    determine the object as a first object responsive to determining that a distance between two second geometric features that intersect with the first geometric features is smaller than a threshold; and
    determine the object as a second object responsive to determining that the distance is not smaller than the threshold.

15. The computer readable storage medium of claim 9, further comprising instructions to determine the first object information as incorrect responsive to difference between the first object information and second object information exceeding a threshold, the second location information determined from a second single view image preceding the first single view image.

16. The computer readable storage medium of claim 9, further comprising instructions to determine location of the object based on the two dimensional location of the first feature and location information of another object in the normalized image.

17. A system for localizing and detecting an object, comprising:

a pre-processing module configured to receive a first single view image including the object, the first single view image in a perspective projection, the pre-processing module configured to map the single view image to a normalized image by a homography transform, the normalize image representing a pseudo plan view of the object;

a feature extraction module configured to detect first geometric features in the normalized image; and an object information generator configured to detect first geometric features from the normalized image and analyzing the detected first geometric features to identify the object, the object information generator generating first object information including the identity of the object.

18. The system of claim 17, wherein the object information generator is further configured to generate location information of the object by analyzing the detected first geometric features, the location information representing location of the object, the object information generator including the location information in the first object information.

19. The system of claim 17, wherein the feature extraction module is configured to detect the first geometric features by detecting edges in the normalized image, and to detect circle features in the normalized image by performing Hough circle transform on the detected edges.

20. The system of claim 17, wherein the feature extraction module is configured to detect second geometric features from the normalized image and select one or more first geometric features as representing the object by identifying whether the first geometric features intersect with two or more second geometric features.

21. The system of claim 20, wherein the feature extraction module is configured to detect the second geometric features by detecting edges in the normalized image and detecting line features in the normalized image by performing Hough line transform on the detected edges.

22. The system of claim 17, further comprising an object information buffer configured to store second object information determined from a second single view image preceding the first single view image, the object information generator configured to determine the first object information as incorrect responsive to a difference between the first object information and the second object information exceeding a threshold.

* * * * *